United States Patent [19]
York

[11] 3,788,431
[45] Jan. 29, 1974

[54] SEAT SAFETY BRAKE CONTROL SYSTEM
[75] Inventor: Donald W. York, Battle Creek, Mich.
[73] Assignee: Clark Equipment Company, Buchanan, Mich.
[22] Filed: Aug. 10, 1972
[21] Appl. No.: 279,581

[52] U.S. Cl.............................. 188/109, 180/101
[51] Int. Cl.............................................. B60t 7/02
[58] Field of Search...... 180/99, 101, 103; 188/109; 303/19

[56] References Cited
UNITED STATES PATENTS
| | | | |
|---|---|---|---|
| 3,332,522 | 7/1967 | Dence................................ | 188/109 |
| 1,956,978 | 5/1934 | Nafziger...................... | 188/109 UX |
| 3,280,933 | 10/1966 | Jones............................. | 188/109 X |
| 3,716,116 | 2/1973 | Von Seggern....................... | 188/109 |

Primary Examiner—Duane A. Reger
Attorney, Agent, or Firm—John C. Wiessler

[57] ABSTRACT

A vehicle operator's seat safety brake control combined in a vehicle hydraulic system responsive to apply the brake in the event that either the engine is not operating or the seat is not occupied, including interrelated solenoid valve, brake cylinder and vehicle ignition controls for insuring full hydraulic system pressure initially to release the brake by blocking off the vehicle hydraulic system from the brake control and for reconnecting the vehicle hydraulic system and brake control when the brake is released.

5 Claims, 1 Drawing Figure

PATENTED JAN 29 1974 3,788,431
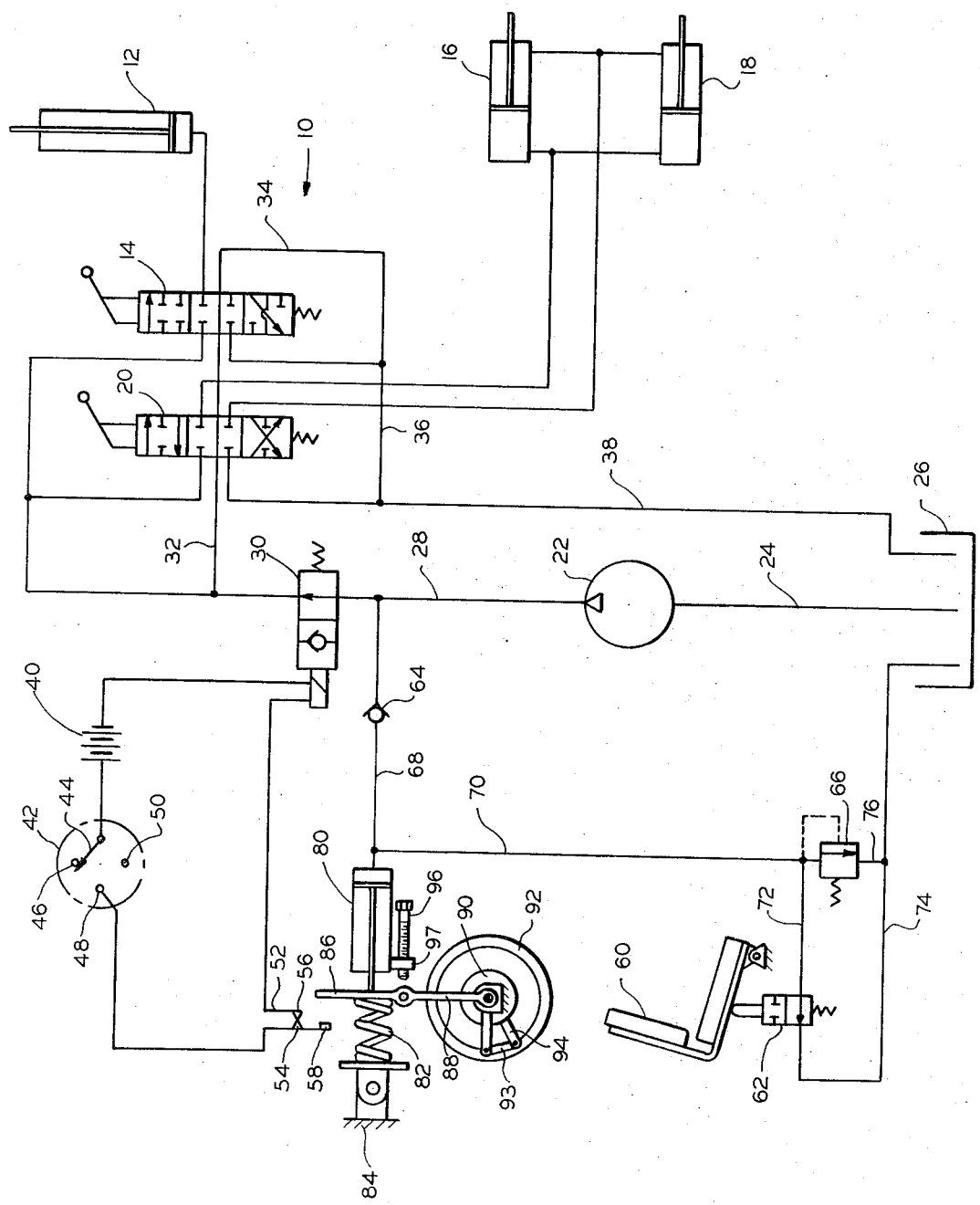

SEAT SAFETY BRAKE CONTROL SYSTEM

BACKGROUND OF THE INVENTION

The field of art to which the invention pertains relates to vehicle brake controls, and more particularly to vehicular operator's hydraulic seat controls for industrial and commercial type vehicles, often referred to as "dead-man" brakes.

Generally both mechanical and hydraulic types of dead-man brake control systems for certain types of vehicles, such as fork lift trucks, are known. Such mechanical systems ordinarily comprise mechanical linkages that are actuated when the operator's seat is occupied to release the brake, and such linkages frequently become relatively complex and bulky to provide the substantial movement required to actuate the linkage to release the brake. Other devices have provided both mechanical and switch actuated hydraulic cylinder brake release means which can provide any desired amplification of braking release power required as well as being less complex and bulky than some mechanical actuators per se.

Certain problems inhere in a brake release control for lift trucks, for example, wherein the brake control is a part of the the main hydraulic control system, such as for operating tilt and lift cylinders in conjunction with operation of the fork lift mast. I have found that significant improvements and added safety are effected by separating the brake control from the main hydraulic system during release of the brake, as when the operator first locates on the seat, and then recombining the brake and main hydraulic system after full brake release is assured. In addition, it has been found particularly advantageous to provide automatic parking brake application whenever the engine is shut down.

SUMMARY OF THE INVENTION

The invention includes blocking valve means for selective interruption of pressure fluid supply to a main vehicle hydraulic system upon the initiation of release of the vehicle brake, which condition of operation is effected by the operator locating on the vehicle seat which activates the dead-man control. Simultaneously with the completion of brake release the blocking valve means is conditioned to recombine the main hydraulic system with the braking system until such time as another brake operation occurs.

It will be understood, of course, that the disclosure herein of a specific embodiment in a lift truck hydraulic circuit is exemplary only, since the principle of the invention which involves selective separation of the brake control from the main hydraulic system, is also applicable to other suitable industrial or commercial vehicle hydraulic systems in which a dead-man brake is found to be desirable.

BRIEF DESCRIPTION OF THE DRAWING

The sole FIGURE represents schematically a lift truck hydraulic system for controlling lift and tilt operations of the lifting mast and my brake control which is coordinated therewith.

DESCRIPTION OF ONE EMBODIMENT

Referring now in detail to the drawing, a lift truck hydraulic system is indicated generally at numeral 10; it includes a single acting lift cylinder assembly 12 for controlling by means of a manually controlled main control valve 14 the elevation of a fork in the upright or mast of a lift truck, not shown, in a well-known manner. A pair of double-acting tilt cylinders 16 and 18 are suitably interconnected with a manual double-acting control valve 20 which is interconnected with the tilt cylinders by a plurality of hydraulic lines in a well-known manner to effect forward and rearward tilting movement of the lift truck mast as required for various material handling operations, all as is well-known.

Both of the control valves 14 and 20 are of the open-center type, and when they are in neutral or inoperative positions, as shown, the discharge of a pump 22, which is connected by an intake line 24 to a reservoir 26, supplies hydraulic fluid through discharge line 28 and a blocking solenoid valve 30 when it is in its normally open position, back to the sump 26 by way of conduits 32, 34, 36 and 38. Operation of either or both of valves 14 and 20 will interrupt the circulation of hydraulic fluid to the sump, as aforesaid, and direct all or a portion thereof to operate the cylinders 16, 18 and/or 12 as desired by the operator.

Up to this point, except for the inclusion of blocking solenoid valve 30, the hydraulic system explained above in general terms is conventional, and need not be further described herein.

An engine ignition switching circuit is shown connected schematically to solenoid valve 30; it includes a battery 40 and ignition switch 42 having a switching element 44 and three contact points 46, 48 and 50 comprising engine "off," "run," and "start" conditions, respectively, and a normally closed control switch 52 having contactor elements 54 and 56 and an element 58 adapted to be actuated under certain conditions to open switch contactors 54 and 56. When the latter condition occurs the ignition switch circuit is broken which permits solenoid valve 30 to return to its normally open position.

An operator's seat control circuit is combined and coordinated with the ignition switch circuit, solenoid valve 30 and pump 22 to effect the desirable objectives of this invention as set forth above. The seat control circuit includes a pivoted operator's seat 60, an "on-off" valve 62 spring biased toward an open position, a one-way check valve 64, and a pressure relief valve 66, all connected as shown by conduits 68, 70, 72, 74 and 76 to reservoir 26. Whenever an operator is located on seat 60 valve 62 is closed; whenever the operator exists the seat, valve 62 is spring actuated open. Valve 66, of course, remains closed except in the event of a circuit over-pressure condition.

A single acting hydraulic pressure brake release cylinder and piston assembly 80 is connected at the head end to conduit 68 and is urged to a retracted position by an external spring 82 operative between an abutment 84 and an actuator member 86 which is illustrated as an extension of a brake lever 88 suitably connected mechanically to release and apply a seat brake 90 which may be of a convential internal expanding shoe cam and lever actuated drum brake for braking the shafts of a vehicle drive motor 92, for example. Lever 88 pivots counterclockwise from the brake applied position illustrated to rotate a linkage 93 to release the brake through a connected brake arm 94. A threaded rod 96 is supported from a bracket 97 of cylinder 80 for manually releasing the brake by actuating it against spring 82 in the event of hydraulic circuit failure.

When pump discharge pressure fluid is conducted to line 68 through check valve 64, i.e., when the vehicle engine is in operation from which operates pump 22 through an accessory drive, the piston rod of cylinder 80 is actuated in extension to compress spring 82 and activate lever 86 in a counterclockwise direction, as shown, which, at the end of the piston stroke, contacts switch element 58 which opens switch elements 54 and 56. The piston of release cylinder 80 cannot be thus actuated if the operator is not located on seat 60 inasmuch as in that event valve 62 is open and the pump discharges to the reservoir 26 and therefore cannot generate pressure to actuate the piston in extension or hold the piston in extension following a previous actuation thereof.

If the engine is not in operation and the operator is not located on seat 60, the hydraulic system illustrated is inactive with the control valves 14 and 20 in the neutral open-center positions as shown, valves 30 and 62 normally open as shown, the normally applied seat brake 90 activated by spring 82 as shown, and with control switch 52 closed and ignition switch 42 off. Now if the ignition switch element 44 is actuated to contact 50 to crank the engine, no circuit is completed to actuate solenoid valve 30 closed, and the pump 22 does not build-up a discharge pressure even though operator seat valve 62 is closed. In the latter condition, engine operated pump 22 discharges hydraulic fluid at atmospheric pressure, circulating to the reservoir through valves 30, 20 and 14 and conduits 28, 32, 34, 36 and 38.

Upon starting the engine at the end of the cranking cycle switch element 44 is in engagement with contact 48 thereby energizing valve 30 closed. Pump 22 now generates discharge pressure which flows to release cylinder 80 by way of check valve 64 to extend the piston thereof, compressing spring 82 and releasing the normally applied brake 90 by way of arm 94, link-age 93 and lever 88. At the time of full brake release by extension of the piston rod, member 86 of brake lever 88 pivots into element 58 as aforesaid to open switch 52, whereupon valve 30 is returned to its normally open position and the hydraulic system becomes operative to energize lift cylinder 12 and/or tilt cylinders 16 and 18 as selected by the operator at control valves 14 and 20. During such operations the system pressure is continuously applied as a static pressure at relief cylinder 80 in order to maintain the brake in and "off" condition. Should any fluid leakage occur through the seat valve 62, or otherwise, it is replaced by the continuous communication of cylinder 80 with conduit 28 so that the release cylinder is maintained fully extended as required.

If at any time during operation for any reason the operator should exit seat 60, valve 62 is immediately actuated open, thereby causing the brake to be applied as previously explained. Thus, the brake functions always as a "dead-man" brake and is responsive both to operator's seated presence and to engine operation. In addition it should be noted that no hydraulic actuated function can be activated unless the operator is present on the seat since the pump discharge flow is otherwise directed to the reservoir at atmospheric pressure through check valve 64 and valve 62. This is an added safety feature.

Although I have described and illustrated a preferred embodiment of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. A normally applied fluid actuated safety brake for vehicles having a fluid system circuit means comprising a reservoir, a fluid pump connected to the reservoir, a fluid actuated vehicle work means fluid connected to and operated by the pump, first valve means in the circuit means operatively intermediate the pump and the work means and the pump and the safety brake, an operator's station, second valve means in the circuit means responsive to the presence or the absence of the operator, and brake actuator means responsive to a fluid pressure condition in the circuit means for releasing the brake when said first and second valve means are actuated to first and second positions, respectively.

2. A safety brake as claimed in claim 1 wherein said first valve means in said first position interrupts fluid flow to said vehicle work means.

3. A safety brake as claimed in claim 1 wherein said second valve means in said second position maintains said fluid pressure condition in said brake actuator means.

4. A safety brake as claimed in claim 2 wherein said brake actuator means is operatively connected to said first valve means to cause said valve means to be actuated to a second position when the brake actuator means is fully actuated to realease the brake, said first valve means when in said second position reopening fluid flow to said vehicle work means.

5. A safety brake as claimed in claim 4 wherein a vehicle ignition circuit is operatively connected to said brake actuator means and to said first valve means for actuating said first valve means to said first position when the ignition circuit is closed, said brake actuator means causing said ignition circuit to open upon actuation to release the brake which also causes said first valve means to be actuated to said second position.

* * * * *